United States Patent
Matei et al.

(10) Patent No.: US 7,313,252 B2
(45) Date of Patent: Dec. 25, 2007

(54) METHOD AND SYSTEM FOR IMPROVING VIDEO METADATA THROUGH THE USE OF FRAME-TO-FRAME CORRESPONDENCES

(75) Inventors: Bogdan Calin Mihai Matei, Monmouth Junction, NJ (US); Clay Douglas Spence, Princeton Junction, NJ (US); Arthur Robert Pope, Princeton Junction, NJ (US); Barbara Viviane Hanna, Princeton Junction, NJ (US); Michael Wade Hansen, Long Valley, NJ (US)

(73) Assignee: Sarnoff Corporation, Princeton, NJ (US)

( * ) Notice: Subject to any disclaimer, the term of this patent is extended or adjusted under 35 U.S.C. 154(b) by 46 days.

(21) Appl. No.: 11/390,700

(22) Filed: Mar. 27, 2006

(65) Prior Publication Data

US 2006/0256200 A1 Nov. 16, 2006

Related U.S. Application Data

(60) Provisional application No. 60/665,461, filed on Mar. 25, 2005.

(51) Int. Cl.
*G06K 9/00* (2006.01)
*H04N 7/18* (2006.01)

(52) U.S. Cl. ............... 382/100; 382/106; 382/107; 382/260; 348/143

(58) Field of Classification Search ............... 382/100, 382/103, 106, 107, 260, 278, 286, 291, 305; 348/143, 144, 116, 117
See application file for complete search history.

(56) References Cited

U.S. PATENT DOCUMENTS

| 5,649,032 A | | 7/1997 | Burt et al. |
| 6,128,396 A | * | 10/2000 | Hasegawa et al. .......... 382/103 |
| 6,597,818 B2 | | 7/2003 | Kumar et al. |
| 7,184,072 B1 | * | 2/2007 | Loewen et al. ............. 348/144 |

OTHER PUBLICATIONS

Adding Precision to Airborne Video With Model Based Registration by John A. Van Workhum and Steven G. Blask, published in Second International Workshop on Digital and Computational Video (IEEE Computer Society, Feb. 2001).

Factorization Methods for Discrete Sequential Estimation by Gerald J. Bierman (Academic Press 1977), pp. 69-76, 84-88, 90, 110-111, 115-120, 136-141 and 183-210.

Multiple View Geometry in Computer Vision, by Richard Hartley and Andrew Zisserman, Cambridge University Press, Cambridge, UK; New York, NY, USA (2000), pp. 143-144 and 314.

\* cited by examiner

*Primary Examiner*—Phuoc Tran
(74) *Attorney, Agent, or Firm*—Lowenstein Sandler PC

(57) ABSTRACT

A method and system for improving the accuracy and timeliness of video metadata by incorporating information related to the motion of the camera as derived from the video imagery itself. Frame-to-frame correspondences are used to accurately estimate changes in camera pose. While the method and system do not require geo-registration, geo-registration results, if available, may be considered in processing the video images and generating improved camera pose estimates.

22 Claims, 3 Drawing Sheets

METHOD AND SYSTEM FOR IMPROVING VIDEO METADATA THROUGH THE USE OF FRAME-TO-FRAME CORRESPONDENCES

CROSS-REFERENCE TO RELATED APPLICATION

This application claims the benefit of U.S. Provisional Application No. 60/665,461, filed Mar. 25, 2005. U.S. Provisional Application No. 60/665,461 is hereby incorporated herein by reference.

FIELD OF THE INVENTION

The present invention relates to a method and system for processing, interpreting, and analyzing video and related information captured by a camera, particularly an aerial surveillance camera.

BACKGROUND OF THE INVENTION

Successful interpretation and analysis of video from a surveillance camera, such as an aerially positioned camera, requires the ability to determine the geographic location of one or more objects viewed by the video.

The ability to accurately determine the geographic location of objects, depends in part on a knowledge and consideration of the camera's pose (i.e., the camera's geographic location, orientation, and field of view). Identifying the correct geographic location, referred to as "geo-location," provides for a more accurate interpretation of the video, by properly placing the video in context relative to other geographic information, such as, for example, maps, reference imagery, and other data obtained from real-time sensors.

Typically, video from an aerial surveillance camera is accompanied by metadata containing periodic reports of measurements from which the camera's pose may be estimated. These measurements usually include the current location and orientation of the aircraft carrying the camera, as determined by instruments such as global positioning system (GPS) receivers, inertial measurement units, compasses, tilt sensors, and the like. If the camera is mounted to the aircraft using camera positioning equipment (e.g., a gimbal) so that it can be pointed somewhat independently of the aircraft, then the metadata also usually includes periodic reports of the current angles of the gimbal's axes of rotation, as determined, for example, by angle sensors. And if the camera has a variable field of view or focal length, as provided, for example, by a zoom lens or lens turret, then the metadata usually includes periodic reports of the current field of view, focal length, and/or choice of lens. This metadata typically accompanies the video as it is transmitted and/or recorded, and is available to video analysis and display systems to aid interpretation of the video.

The metadata delivered by current aerial surveillance systems often suffer from two shortcomings. First, the metadata has insufficient accuracy. That is, errors in the metadata do not allow the video to be geo-located with the accuracy needed to support operations such as viewing the video in the context of other geographic information, fusing video information with information from other sensors, and modeling the dynamics of moving objects tracked in the video. The second problem is that measurements reported in the metadata are usually repeated or updated at a lower rate than that of video frames. For some aerial surveillance systems with which we have experience, measurements are repeated as infrequently as once every two to three seconds. However, even when measurements are repeated every other video frame, the arrival of video frames without accompanying measurements means that the information needed to geo-locate those video frames must be extrapolated or interpolated from measurements taken at other times. Because the aerial platform is usually subject to buffeting and vibration, the missing values cannot be extrapolated or interpolated with sufficient accuracy to support operations such as those listed above.

One approach to improving metadata accuracy and timeliness is to geo-register video frames, as described in U.S. Pat. No. 6,597,818, issued July 2003, and in the article titled "Adding precision to airborne video with model based registration" by John A. Van Workhum and Steven G. Blask, published in *Second International Workshop on Digital and Computational Video* (IEEE Computer Society, February 2001). However, since geo-registration is computationally expensive, it is generally performed on just a subset of video frames (e.g., one frame each second). In addition, geo-registration may fail on some frames for lack of suitable landmarks or features, leading to inaccurate measurements. Furthermore, conventional geo-registration techniques require the availability of appropriate reference imagery.

For some video processing applications, a Kalman Filter is used to estimate linear motion in a target scene. In other applications, an Extended Kalman Filter (EKF) modifies the conventional Kalman Filter by linearizing all nonlinear models (i.e., process and measurement models) to provide motion estimates for images and scenes including nonlinear orientation data. The Extended Kalman filter (EKF) is a set of mathematical equations which uses an underlying process model to make an estimate of the current state of a system and then corrects the estimate using any available sensor measurements. Unfortunately, the EKF has two important potential drawbacks. First, the derivation of the Jacobian matrices, the linear approximators to the nonlinear functions, may be complex, causing implementation difficulties. Second, these linearizations may lead to filter instability if the update cycle (i.e., timestep intervals) are not sufficiently small.

Accordingly, there is a need for a method and system for improving the accuracy and timeliness of video metadata.

SUMMARY OF THE INVENTION

The present invention relates to a method and a system for improving metadata accuracy and timeliness. According to an embodiment of the present invention, the method and system use frame-to-frame correspondences to estimate changes in camera pose. Moreover, although the approach does not require geo-registration, the method and system may incorporate available geo-registration results, and use those results to improve camera pose estimates for all frames.

The present invention provides a method and system to improve the accuracy and timeliness of video metadata by incorporating information about the motion and/or pose of the camera, as derived from the video imagery itself.

BRIEF DESCRIPTION OF THE DRAWINGS

The present invention will be more readily understood from the detailed description of the preferred embodiment(s) presented below considered in conjunction with the attached drawings, of which.

It is to be understood that the attached drawings are for the purpose of illustrating concepts of the present invention and may not be to scale.

DETAILED DESCRIPTION OF THE INVENTION

Figure 1:
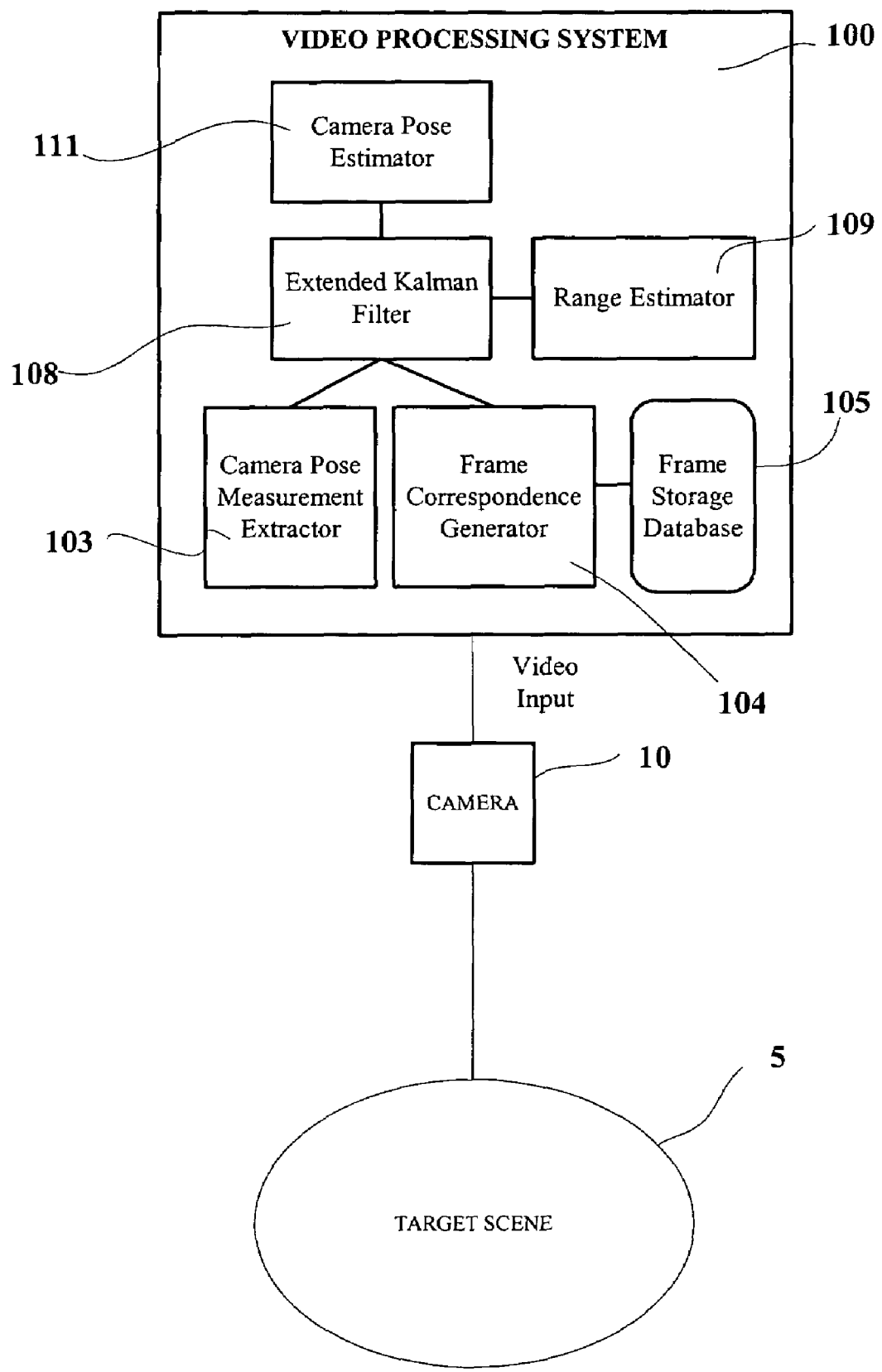
FIG. 1 illustrates an exemplary video processing system and environment, according to an embodiment of the present invention.

The present invention relates to a method and a system for video-based monitoring or surveillance of a geographic environment, referred to as a video surveillance environment 1. FIG. 1 depicts an exemplary video surveillance environment 1 managed by the methods and systems according to the present invention. According to an embodiment of the present invention, the video surveillance environment 1 includes a video processing system 100 communicatively connected to one or more cameras 10 configured to monitor one or more target scenes 5. The term "communicatively connected" is intended to include any type of connection, whether wired or wireless, in which data may be communicated. The term "communicatively connected" is intended to include a connection between devices and/or programs within a single computer or between devices and/or programs on separate computers. One having ordinary skill in the art will appreciate that the one or more cameras 10 may include any suitable image capturing device.

According to an embodiment of the present invention, the one or more cameras 10, collectively referred to as a camera 10, monitor a target scene 5, capture video of the target scene 5, and provide a video input to the video processing system 100. The video input includes two main components: metadata 101 and a video frame stream including one or more video frames 102. The metadata 101 includes data and information related to the pose of the camera and/or any equipment used to position the camera 10. For example, an aerial surveillance camera 10 may be attached to an aircraft and positioned by camera positioning equipment, such as a gimbal. As used herein, the term "camera positioning equipment" is intended to include any equipment (e.g., an aircraft and/or gimbal or similar device) that influences or controls the position of the camera 10. One having ordinary skill in the art will appreciate that the term "camera" may include any suitable device for viewing and processing one or more images.

According to an embodiment of the present invention, the metadata 101 may include, but is not limited to: 1) measurements and/or information related to the camera pose (i.e., the camera's geographic location, orientation, field of view, etc.); 2) a location and orientation of the camera or camera positioning equipment; 3) an angle of the camera positioning equipment's axes of rotation; and 4) other properties or characteristics of the camera, such as, for example, focal length, type of lens, etc.

According to an embodiment of the present invention, as depicted in FIG. 1, the video processing system 100 is a computer-based system which includes but is not limited to the following components: a Camera Pose Measurement Extractor 103, a Frame Correspondence Generator 104, a Frame Storage Database 105, an Augmented Extended Kalman Filter (EKF) 108, a Range Estimator 109, and a Camera Pose Estimator 112. The term "computer" is intended to include any data processing device, such as a desktop computer, a laptop computer, a mainframe computer, a personal digital assistant, a server, a handheld device, or any other device able to process data.

Figure 2:
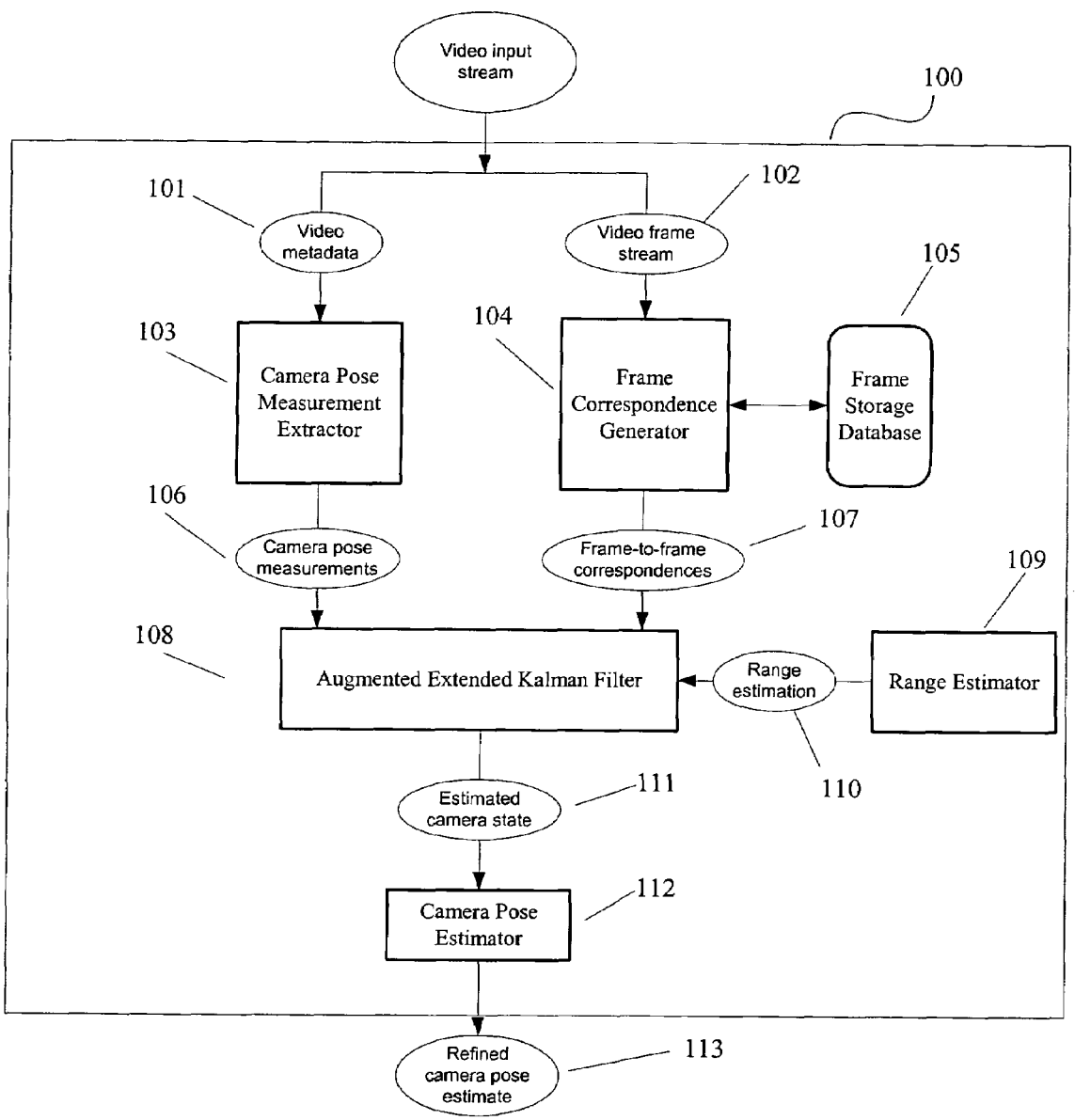
FIG. 2 illustrates steps according to an exemplary video processing method, according to an embodiment of the present invention.

FIG. 2 illustrates the data processing as performed by an exemplary video processing system 100 of the present invention. As shown in FIGS. 1 and 2, the video input including the video frame stream 102 and the metadata 101 is provided by the one or more cameras 10 to the communicatively connected video processing system 100.

The metadata stream 101 is processed by the Camera Pose Measurement Extractor 103 to extract those measurements that relate to the pose of the camera, referred to as the camera pose measurements 106. The Camera Pose Measurement Extractor 103 provides the camera pose measurements 106 to the communicatively connected Augmented EKF 108, for further processing, as described in detail below.

According to an embodiment of the present invention, the video frames 102 of the video input are processed by the Frame Correspondence Generator 104 to identify the frame-to-frame correspondences 107 between successive pairs of frames, and provided to the communicatively connected Augmented EKF 108 for further processing. According to an embodiment of the present invention, the Frame Correspondence Generator 104 may be communicatively connected to a Frame Storage Database 105. The Frame Storage Database 105 is a computer-accessible memory device configured to store one or more video frames 102. The Frame Correspondence Generator 104 may access the Frame Storage Database 105, retrieve a video frame and compare that frame with a subsequent video frame as part of the frame-to-frame correspondence analysis. One having ordinary skill in the art will appreciate that the Frame Correspondence Generator 104 may be a computer-executable program configured to perform any suitable frame correspondence generation technique, such as, for example, using a frame-to-frame alignment technique described in detail in U.S. Pat. No. 5,649,032, issued to Burt et al. U.S. Pat. No. 5,469,032 is incorporated by reference herein.

According to an embodiment of the present invention, the Frame Correspondence Generator 104 generate the frame-to-frame correspondences 107 by aligning consecutive frames relative to each other, aligning frames in consecutive pairs, and/or aligning each frame relative to a common reference frame. An exemplary alignment method suitable for use in the present invention is described in U.S. Pat. No. 5,469,032. The alignment process described therein produces a transform, such as, for example, an affine transform, that maps all points in one frame to approximately corresponding positions in the subsequent frame. Given this transform, the bounds of the first frame into the coordinate system of the second are transformed, and intersected with the bounds of the second frame, to produce a polygon in the second frame. Each vertex of the polygon determines a corresponding pair of points, both of which lie within their respective frames. According to an embodiment of the present invention, four or fewer of these correspondences may be generated for each frame pair.

According to another embodiment of the present invention, the Frame Correspondence Generator 104 may generate the frame-to-frame correspondences 107 by matching point neighborhoods in one frame to the most similar corresponding neighborhoods in the other frame. This point matching method may be performed by testing a neighborhood of one frame at each of a plurality of possible positions in the other frame. Each position is ranked according to a match measure, such as normalized cross-correlation of image intensities. The highest ranking choices of neighborhoods and positions then define the point correspondences to be used. Correlation surfaces may be interpolated in order to locate these correspondences to sub-pixel precision.

According to yet another embodiment of the present invention, the Frame Correspondence Generator 104 may generate the frame-to-frame correspondences 107 according to a combination of the methods described above. For example, an aligning transform computed by the one or more exemplary alignment methods described above may be used as a starting point for identifying the corresponding neighborhoods searched according to the exemplary matching point method described above.

Referring to FIG. 2, the camera pose measurements 106 and the frame-to-frame correspondences 107 are both provided to the Augmented EKF 108. The Augmented EKF 108 is a computer-executable module or program configured to executed an augmented version of an Extended Kalman filter, to generate and maintain an estimate of the state of the camera 10, referred to as the estimated camera state 111. The estimated camera state 111 includes, but is not limited to, the instant pose of the camera 10 (i.e., a snapshot of the pose of the camera at a particular instant), the rate of change of the pose of the camera 10, the uncertainty in the instant pose measurement and/or the rate of change of the pose measurement, etc. The steps performed by the Augmented EKF 108 are described in greater detail below with reference to FIG. 3.

The Augmented EKF 108 is communicatively connected to a Range Estimator 109, which is a computer-executable program configured to provide the Augmented EKF 108 with estimates of the range from the camera 10 to the target scene 5, given an estimate of the camera's pose. These estimates are referred to as range estimations 110. One exemplary method that may be employed by the Range Estimator 109 to generate the one or more range estimations 110 includes the use of a digital terrain elevation model to compute a range by identifying the point of intersection of a ray with the height field represented by the elevation model.

According to an embodiment of the present invention, the Augmented EKF 108 may be updated repeatedly to maintain a refreshed "current" estimated camera state 111. Each update cycle (i.e., the cycle of steps performed by the Augmented EKF 108 to update the estimated camera state 111 at a set interval) may incorporate any newly captured camera pose measurements 106 and/or frame-to-frame correspondences 107, and produces a new estimated camera state 111 that corresponds to the current time.

Although the present invention describes the use of an augmented EKF, one having ordinary skill in the art will appreciate that that other types of filters, such as, for example, discrete sequential estimation filters may be used in conjunction with the present invention to estimate the camera pose based on various measurements. For example, a square root information filter (SRIF), as described in detail in the article titled "Factorization Methods for Discrete Sequential Estimation," by Gerald J. Bierman (Academic Press 1977), incorporated by reference herein, may provide improved stability and numeric accuracy. Substituting a SRIF for the EKF requires straightforward changes to the filter's representation of state covariance, and to the equations governing the prediction and update steps, described in detail below.

Referring to FIG. 2, the estimated camera state 111 is provided by the Augmented EKF 108 to the communicatively connected Camera Pose Estimator 112. According to an embodiment of the present invention, the Camera Pose Estimator 112 is a computer-executable program configured to convert the estimated camera state 111 into an estimate of the camera's pose, referred to as the improved camera pose estimate 112.

According to an embodiment of the present invention, the improved camera pose estimate 112 may be generated or updated as frequently as desired, regardless of the refresh rate (i.e., the update frequency) of the camera pose measurements 106, the frame-to-frame correspondences 107, the video metadata 101, and/or the video frames 102.

According to an embodiment of the present invention and for the purposes of the detailed description provided below, the Augmented EKF 108 is described as having a refresh rate of once per video frame.

Figure 3:
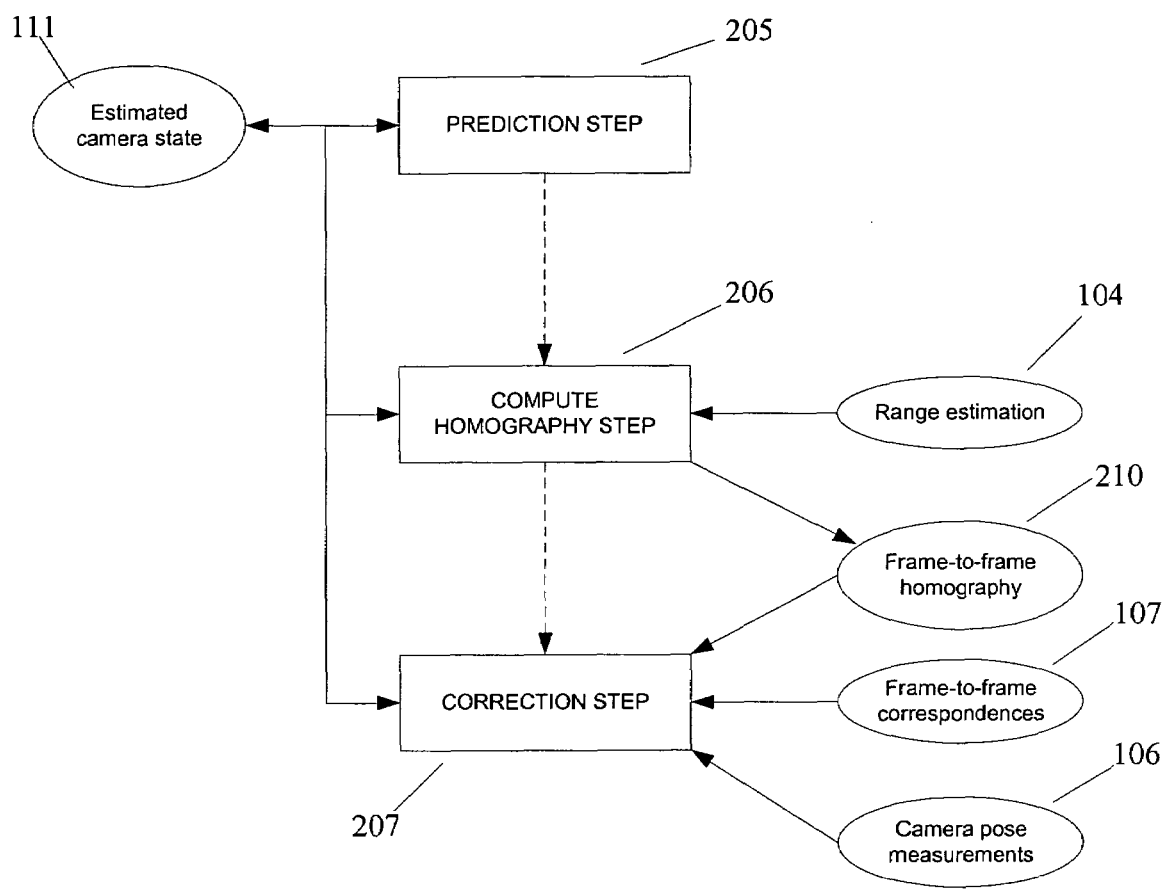
FIG. 3 illustrates steps performed by an exemplary Extended Kalman Filter, according to an embodiment of the present invention.

FIG. 3 illustrates the steps performed by an exemplary Augmented EKF 108, according to an embodiment of the present invention. In FIG. 3, the dotted arrows represent the process flow, wherein the steps are represented by rectangles, and the solid arrows represent the data flow, wherein the data is represented by ovals.

According to an embodiment of the present invention, the Augmented EKF 108 is configured to perform a method for generating an updated estimated camera state 111 according to an update cycle, or set interval of time, wherein the method includes, but is not limited to, the following steps: a prediction step 205, a compute homography step 206, and a correction step 207.

According to an embodiment of the present invention, the Augmented EKF 108 is configured to update the estimated camera state 111 from the time of the previous video frame to the time of the current one. At the start of an update cycle, prediction step 205 is performed in order to predict the camera's pose as of the current frame. One having ordinary skill in the art will appreciate that a conventional Kalman prediction step may be used. The predicted state and the range estimation 104 (as provided by the Range Estimator 109 shown in FIG. 2) are used to compute a frame-to-frame homography 210 that approximates the mapping from points in the current video frame to positions in the previous video frame, in step 206. Finally, a correction step 207 is performed in which the camera pose measurements 106, frame-to-frame correspondences 107, and the frame-to-frame homography 210 are used to correct or adjust the estimated camera state 111. One having ordinary skill in the art will appreciate that a conventional Kalman correction method may be used in conjunction with the present invention.

According to an embodiment of the present invention, during the correction step 207, points in the current video frame for which correspondences are available are mapped via the homography to their positions in the previous frame. The differences between these mapped positions and the positions of the same points as specified by the frame-to-frame correspondences 107 defines an error measure that contributes to the correction of the estimated camera state 111.

The following is a detailed description of the steps performed by an exemplary video processing system 100, according to an embodiment of the present invention.

Definitions

This section provides definitions for the coordinate systems and notations set forth in the detailed description of the methods and systems of the present invention.

The term "air vehicle coordinate system (AVCS)," is intended to include a three-dimensional, cartesian coordinate system that is located at the camera platform (i.e., aircraft) or camera positioning equipment, but oriented geographically. The air vehicle coordinate system, represented in the following equations by the symbol "AVCS," includes an origin at the camera's optical center. The AVCS includes a positive X axis extending due east from the origin, a positive Y axis extending due north, and a positive Z axis extending vertically upward.

The term "camera coordinate system" is intended to include a three-dimensional, Cartesian coordinate system affixed to the camera 10. The camera coordinate system, represented in the following equations by the symbol "C," includes an origin at the camera's optical center. The camera coordinate system includes a positive X axis extending to the right as viewed from behind the camera 10, a positive Y axis extending downward, and a positive Z axis coinciding with the portion of the camera's principal axis extending in front of the camera 10.

One having ordinary skill in the art will appreciate that alternative coordinate systems may be used to represent the position and/or orientation of the camera 10, according to an embodiment of the present invention.

According to an embodiment of the present invention, a rotation that transforms a point from camera coordinates to AVCS coordinates is represented by the symbol "RCAVCS." Rotations may be represented by three-by-three matrices or in angle-axis form (i.e., as a unit vector in camera coordinates about which the rotation takes place, multiplied by the rotation angle, in radians). The operation "$R(\theta)$" denotes conversion of a rotation $\theta$ from angle-axis form to a rotation matrix (see Appendix A). The inverse operation, converting a rotation matrix R to an angle-axis vector, is denoted as "$r(R)$."

The symbol "$J(\theta)$" is used to denote a three-by-three Jacobian matrix that maps a small rotation expressed as an angle-axis vector into a corresponding change in N. The symbol "$J_k(\theta)$" is used to denote the three-by-three derivative of $R(\theta)$ with respect to the k-th component of $\theta$. Both are described in detail in Appendix A.

The subscripts "t" and "t+1" are used to denote the previous and current Augmented EKF 108 update cycles. The update cycle interval (i.e., time between update cycles), in seconds, is denoted as "$\tau$".

The Augmented EKF 108 is configured to model the camera 10 as having a constant linear acceleration, constant rate of rotation, and constant rate of change of focal length. The Augmented EKF 108 state vector includes, but is not limited to, the elements defined below.

State Vector Elements

The location of the camera, herein symbol "u", defines the location of the AVCS origin. The location of the camera (u) may be represented as longitude in degrees, geodetic latitude in degrees, and height above the reference ellipsoid in meters, all with respect to a common geodetic datum. One having ordinary skill in the art will appreciate that alternative representations of state may be used, such as, for example, the location of the camera (u) may be represented in terms of meters of displacement from some fixed origin.

The velocity of the camera, herein symbol "v", may be represented in terms of meters per second, in the AVCS coordinate system.

The acceleration of the camera, herein symbol "a", may be represented in terms of meters per second per second, in the AVCS coordinate system.

The orientation of the camera, herein symbol "$\theta$", may be represented as a rotation from camera to AVCS coordinates, in angle-axis form. The orientation of the camera ($\theta$) may be formulated as a three-element vector in units of meter-radians.

The rate of rotation of the camera, herein symbol "$\omega$", may be represented as a rate of change of the orientation angle-axis. The rate of rotation of the camera ($\omega$) may be formulated as a three-element vector in units of meter-radians per second.

The focal length of the camera, herein symbol "l", may be represented as the natural logarithm of the focal length as measured in meters.

The rate of change of the focal length of the camera, herein symbol "b", may be represented as the rate of change of the logarithm of the focal length, in log meters per second.

The aggregate vector of the above-identified state elements is denoted as symbol "x", and its associated covariance matrix is denoted by symbol "P". The various components of x may be denoted as $x_u$, $x_v$, $x_a$, etc. Alternatively, reference to the state components may be done using the following abbreviated notation: u, v, a, etc. Similarly, the symbol "z" may be used as shorthand in reference to the state element representing camera height.

Given the above definitions and notations, the following is a detailed description of the steps performed by an exemplary Augmented EKF 108, according to an embodiment of the present invention.

During an initialization stage (i.e., prior to the prediction step 205, the Augmented EKF state x is initialized using the first two sets of measurements received in the metadata stream. The camera location, orientation, and focal length reported in the second set of measurements are used to initialize the corresponding components of the state vector. The difference between the first and second set of measurements is used to initialize the velocity, rotation rate, and log focal length rate components of the state vector. According to an embodiment of the present invention, the acceleration component of the state vector is initialized to zero. According to an embodiment of the present invention, the covariance P is initialized using predefined constants.

Next, the Augmented EKF 108 performs the prediction step 208, to predict an estimated camera state 111 which is updated to the current time. In this step, the Augmented EKF 108 uses a state update or dynamics matrix, D, that defines the transition from the previous state to the current one, and a process noise covariance matrix, Q, that defines the corresponding increase in the uncertainty of the estimated camera state 111. The state and state covariance are updated according to the following equations:

$$x_{t+1} \leftarrow D\, x_t \text{ and} \tag{1}$$

$$P_{t+1} \leftarrow D\, P_t D^T + Q. \tag{2}$$

In the absence of noise, the updates to the u, v, and a components of the state are defined according to the following equations:

$$u_{t+1} = u_t + v_t \tau + \frac{1}{2} a_t \tau^2, \tag{3}$$

$$v_{t+1} = v_t + a_t \tau, \text{ and} \tag{4}$$

$$a_{t+1} = a_t. \tag{5}$$

Note, for the purposes of clarity, the above formulation ignores the fact that "u" is expressed using degrees whereas "v" and "a" are expressed using meters, which is addressed below.

A noise term or terms is added in order to properly describe the dynamics. This is done in a manner such that the previous camera location, $u_t$, may be inferred from the current state, $x_{t+1}$. To do so, the term "$a_t$" on the right hand side of equations 3 and 4 is replaced by "$a_{t+1}$", as the two expressions are equal. Similarly, in Equation 3, the term "$v_t$" on the right hand side is replaced with an equivalent expression in terms of "$v_{t+1}$" and "$a_{t+1}$", resulting in the following equations:

$$u_{t+1} = u_t + v_{t+1}\tau - \frac{1}{2}a_{t+1}\tau^2, \quad (6)$$

$$v_{t+1} = v_t + a_{t+1}\tau, \text{ and} \quad (7)$$

$$a_{t+1} = a_t. \quad (8)$$

The above equations allow for $u_t$ to be expressed in terms of the current estimated camera state, as follows:

$$u_t = u_{t+1} - v_{t+1}\tau + \frac{1}{2}a_{t+1}\tau^2 \quad (9)$$

According to an embodiment of the present invention, a noise variable (w) may be added to Equation 8. As such, the equations may be rewritten with only the previous state and current noise on the right-hand sides, as follows:

$$u_{t+1} = u_t + v_t\tau + \frac{1}{2}a_t\tau^2 + \frac{1}{2}w_{t+1}^a\tau^2, \quad (10)$$

$$v_{t+1} = v_t + a_t\tau + w_{t+1}^a\tau, \text{ and} \quad (11)$$

$$a_{t+1} = a_t + w_{t+1}^a. \quad (12)$$

Accordingly, the dynamics matrix for this part of the state in the Augmented EKF 108, wherein "I" is a three-by-three identity matrix and "0" is a three-by-three matrix of zeroes, is as follows:

$$D^l = \begin{pmatrix} I & \tau I & \frac{1}{2}\tau^2 I \\ 0 & I & \tau I \\ 0 & 0 & I \end{pmatrix}. \quad (13)$$

Since the position is expressed as longitude and latitude, in degrees instead of meters, the unit matrices in the second and third columns of the top row need to be replaced with the following expression:

$$\begin{pmatrix} m_x^{-1} & & \\ & m_y^{-1} & \\ & & 1 \end{pmatrix}, \quad (14)$$

where "$m_x$" is a factor used to scale from degrees longitude to meters, and $m_y$ similarly scales from degrees latitude to meters. These scaling factors are computed at the location $u_t$, and, for typical camera velocities and update rates, may be assumed to be constant over the interval $\tau$.

In addition, a matrix for the dynamics noise may be calculated. As is known, the variance of a white noise process increases linearly with time. However, in Equations 10 and 11 the noise is multiplied by $\tau^2/2$ and $\tau$, respectively. These are the factors by which the standard deviations are multiplied, so the variances are multiplied by the squares of these factors. In addition, because the same noise is used for u, v, and a, the noise in each of these is correlated, and multiplied by the factors for the standard deviations. This results in a symmetric nine-by-nine covariance matrix of u, v, and a, as represented by the following expression:

$$Q^l = \begin{pmatrix} \frac{1}{4}\tau^5 q^a & \frac{1}{2}\tau^4 q^a & \frac{1}{2}\tau^3 q^a \\ & \tau^3 q^a & \tau^2 q^a \\ & & \tau q^a \end{pmatrix}, \quad (15)$$

where $q^a$ is the three-by-three covariance matrix for the noise in a unit time for the three acceleration components.

Similar expressions may be derived for the orientation and log focal length. For the orientation ($\theta$) and angular velocity ($\omega$) the update equations are as follows:

$$\theta_{t+1} = \theta_t + \tau J(\theta_t)(\omega_t + w_{t+1}^\omega) \text{ and} \quad (16)$$

$$\omega_{t+1} = \omega_t + w_{t+1}^\omega \quad (17)$$

where $J(\theta)$ is the Jacobian that maps a small rotation expressed as an angle-axis vector into the corresponding change in $\theta$. Note that the noise $w^\omega$ is independent of $w^a$. The corresponding dynamics and covariance matrices are:

$$D^\theta = \begin{pmatrix} I & \tau J(\theta) \\ 0 & I \end{pmatrix} \text{ and} \quad (18)$$

$$Q^\theta = \begin{pmatrix} \tau^3 J(\theta) q^\omega J^T(\theta) & \tau^2 J(\theta) q^\omega \\ & \tau q^\omega \end{pmatrix} \quad (19)$$

For the log focal length, the update equations are as follows:

$$l_{t+1} = l_t + \tau(b_t + \omega_{t+1}^b) \text{ and} \quad (20)$$

$$b_{t+1} = b_t + \omega_{t+1}^b. \quad (21)$$

One having ordinary skill in the art will appreciate that the noise $\omega_{t+1}^b$ is independent of $w^\omega$ and $w^a$. As such, the corresponding dynamics and covariance matrices are as follows:

$$D^l = \begin{pmatrix} 1 & \tau \\ 0 & 1 \end{pmatrix} \text{ and} \quad (22)$$

$$Q^l = \begin{pmatrix} \tau^3 \sigma_l^2 & \tau^2 \sigma_l^2 \\ & \tau \sigma_l^2 \end{pmatrix} \quad (23)$$

According to a conventional extended Kalman filter, the prediction step is followed by a correction step in which measurements are used to refine the filter's estimate of state. According to an embodiment of the present invention, the Augmented EKF 108 performs a compute homography step 206 following the prediction step 205. In the compute homography step 206, a homography is computed that relates points in the current video frame to positions in the previous one. According to an embodiment of the present invention, the homography may be based on, all or in part, the filter's state estimate. In the subsequent correction step 207, measurements in the form of frame-to-frame correspondences 107 are compared to results obtained with the compute homography step 206 in order to correct the estimated camera state 111.

According to an embodiment of the present invention, in its simplest form, the compute homography step 206 approximates the target scene 5 (shown in FIG. 1) as consisting of a single, substantially horizontal plane (i.e., a flat surface).

For example purposes, consider a target scene consisting of a single plane, and two cameras 10 viewing the plane. If the world coordinate system is taken to be the same as the first camera's coordinate system, then that camera's projection matrix may be written as follows:

$$P = K[I|0] \quad (24)$$

where K represents the camera's intrinsic parameters, I is a three-by-three element identity matrix, and 0 is zero column vector. In its simplest form, K includes only the focal length, f and may be represented as follows:

$$K = \begin{pmatrix} f & & \\ & f & \\ & & 1 \end{pmatrix} \quad (25)$$

The second camera may be rotated and translated with respect to the first, and may have different intrinsic parameters. The second camera's projection matrix may be written as follows:

$$p' = K'[R|t]. \quad (26)$$

wherein "t" represents the coordinates of the first camera's origin in the second camera's coordinate system. Similarly, "R" represents the rotation matrix that takes points expressed in the first camera's coordinate system and rotates them into the second camera's coordinate system. Finally, "K'" represents the second camera's intrinsic parameters.

The plane that constitutes the target scene 5 may be defined by the quantities "n" and "d," such that $n^T y + d = 0$ for y in the plane. All of these are expressed in world coordinates, i.e., the coordinate system of the first camera.

A point in the scene imaged by the first camera at homogeneous image coordinates "p" is imaged by the second camera at homogeneous image coordinates "p'", as determined by the following equation:

$$p' = H p \quad (27)$$

where H, a homography, is represented by the following equation, provided in *Multiple View Geometry in Computer Vision*, by Richard Hartley and Andrew Zisserman, Cambridge University Press, Cambridge, UK; New York, N.Y., USA (2000):

$$H = K'(R - tn^T/d)K^{-1}. \quad (28)$$

In the compute homography step 206, the above formula is used to compute a homography that maps points from the current video frame to the preceding one. In terms of the two cameras according to this example, the first camera corresponds to the camera position at the acquisition of the current frame, and the second camera corresponds to the camera position at the acquisition of the preceding frame. For reference, the first camera is referred to as the "current camera", represented by the symbol "$c_2$", and the second camera is referred to as the "previous camera," represented by the symbol "$c_1$".

The vector "t" represents the coordinates of the current camera's origin in the previous camera's coordinate system. The vector "t" may include the velocity "v" from the state vector multiplied by the elapsed time "τ", rotated into the previous camera's coordinate system, resulting in the following expression:

$$t = R_{c_1}^{c_2}(R_{AVCS}^{c_2})^T \tau v \quad (29)$$

For $R^{c2}_{AVCS}$, the rotation from the current camera to the AVCS coordinate system, the state vector component θ is used, as updated by the prediction step 205, transforming it from an angle-axis representation to a rotation matrix. For $R^{c2}_{c1}$, the rotation from the current camera to the previous one, the rate of rotation T from the prediction step 205 is used, simplified according to an assumption that, from time t to time t+1, rotation of the AVCS coordinate system due to displacement of the camera is insignificant, resulting in the following expression:

$$R_{c_1}^{c2} = R(\tau\omega) \quad (30)$$

The quantities "n" and "d" define the ground plane in the current camera's coordinate system. In its simplest form, it is assumed that the ground plane is horizontal (i.e., tangential to the geodetic reference ellipsoid). Thus, in AVCS coordinates these are $n_{AVCS} = (0, 0, 1)^T$ and $d = -h_g + z$, where "$h_g$" is the height of the ground above the reference ellipsoid, and "z" is the height of the aircraft above the reference ellipsoid. This may be verified by noting that the point on the ground directly beneath the aircraft has AVCS coordinates $(0, 0, -z+h_g)^T$, thus satisfying the expression $n_{AVCS}^T y + d = 0$ for the above choices of $n_{AVCS}$ and d. To obtain $c_2$'s coordinates, this expression is rotated by $(R^{c2}_{AVCS})^T$, such that the normal vector required is $n_{c2} = (R^{c2}_{AVCS})^T (0, 0, 1)^T$, and the offset is $d = -h_g + z$.

Accordingly, the homography may be expressed in any of the following forms:

$$H = K_1 R_{c1}^{c2} \left[ I - (R_{AVCS}^{c2})^T \frac{v \otimes (0, 0, 1)}{z - h_g} R_{AVCS}^{c2} \right] K_2^{-1} \quad (31)$$

$$= K_1 R_{c1}^{c2} (R_{AVCS}^{c2})^T \left[ I - \frac{v \otimes (0, 0, 1)}{z - h_g} \right] R_{AVCS}^{c2} K_2^{-1} \quad (32)$$

$$= K_1 R_{c1}^{c2} K_2^{-1} - \frac{1}{z - h_g} \left[ K_1 R_{c1}^{c2} R_{AVCS}^{c2}{}^T v \right] \otimes [(0, 0, 1) R_{AVCS}^{c2} K_2^{-1}]. \quad (33)$$

wherein in the last term, the two expressions in square brackets are a row and a column vector.

As indicated above, the above is described based on an approximation of the target scene 5 as a single, horizontal plane. One having ordinary skill in the art will appreciate that the homography that maps points in one frame to those in a previous frame, as computed according to the exemplary method described above, may be based on treatment of the target scene 5 as consisting of a number of planes, each of which determines its own homography for point correspondences in its portion of the scene. Furthermore, a distinct homography may be used for each pair of corresponding points. According to an embodiment of the present invention, the target scene 5 may be approximated as planar in the vicinity of each corresponding point. The Augumented EKF 108 may estimate the parameters of each of these planar facets, but the facets themselves may be independent.

The exemplary Augmented EKF 108 is described above as estimating a ground plane as horizontal, at height $h_g$ about the reference ellipsoid. However, one having ordinary skill in the art will appreciate that the Augmented EKF 108 may be configured to allow for the use of a ground plane of any orientation. According to an embodiment of the present invention, the height of the ground plane may be obtained from a digital terrain elevation model, according to a suitable method known in the art. The predicted estimate of the camera's pose may be used to project a viewing ray into the elevation model's height field. The ground plane height is taken to be the elevation at the point of intersection.

If the camera 10 is accompanied by a range sensor, such as, for example, a laser rangefinder or LIDAR sensor, the position of the ground plane may be determined from range data.

Referring to FIG. 3, the compute homography step 206 generates a frame-to-frame homography 210 according to the steps provided above, which is provided as an input for use in the correction step 207. In the correction step 207, the estimated camera state 111 is corrected for any discrepancy between measurement values predicted from the estimated state, and the actual measurement values received from the camera platform (i.e., the frame-to-frame correspondences 107 and the camera pose measurements 106). According to another embodiment of the present invention, the actual measurements may further include frame-to-ground correspondences, as described in detail below.

The correction step 207 updates the state and covariance estimates, according to the following expressions:

$$G = P_{t+1} J^T (J P_{t+1} J^T + R)^{-1}, \quad (34)$$

$$x_{t+1} \leftarrow x_{t+1} + Ge, \text{ and} \quad (35)$$

$$P_{t+1} \leftarrow (I - GJ) P_{t+1}. \quad (36)$$

The Kalman gain matrix, denoted by the symbol "G," is computed as shown, and used to update both the state vector and covariance matrix.

The error vector, denoted by the symbol "e", represents the difference between the predicted and actual measurements, with a row for each measurement element. The Jacobian matrix, denoted by the symbol "J", represents the partial derivative of the predicted measurements with respect to the estimated camera state 111, wherein the i-th measurement component is denoted as "$z_i$", and the predicted value is denoted as "$h_i(x)$." The i,j-th element of the Jacobian may be expressed as $\partial h_i / \partial x_j$. For the metadata components $h_i(x) = x_i$ and as such, are not considered in the discussion below. However it is not the identity mapping for the frame-to-frame and georegistration measurements. Provided below is a description related to computation of the elements of the error vector and Jacobian matrix.

The measurement covariance matrix, denoted as "R", includes a row and column for each measurement element. For camera pose measurements 106, covariance values are based on knowledge of the camera 10 and its platform. For measurements based on frame-to-frame correspondences 107, covariance values may be based on uncertainty information provided by the Frame Correspondence Generator 104 and related correspondence estimation process.

For computation of the camera location measurements, including a measurement of camera longitude, latitude, and height, (denoted collectively with a "u" subscript, as in $z_u$), the corresponding elements of the error vector and Jacobian matrix are expressed as follows:

$$e_u = z_u - x_u, \text{ and} \quad (37)$$

$$\frac{\partial h_{u_i}}{\partial x_{u_j}} = \delta_{i,j} \quad (38)$$

wherein $\delta_{i,j}$ is the Kronecker delta, i.e., the i, j-th element of the identity matrix.

According to an embodiment of the present invention, camera orientation measurement may be expressed in the same terms as the state vector's representation of camera orientation, i.e., as an angle-axis vector, $z_\theta$, representing rotation from camera to AVCS coordinates. The error represents the difference in rotation between the predicted and measured orientations. This rotational difference is represented as an angle-axis vector, and is then transformed through a three-by-three Jacobian matrix that relates a rate of rotation to a rate of change in each angle-axis component, as in the following expression:

$$e_\theta = J(x_\theta) r(R(x_\theta)^{-1} R(z_\theta)). \quad (39)$$

Accordingly, the camera orientation measurement Jacobian is expressed as follows:

$$\frac{\partial z_{\theta_i}}{\partial x_{\theta_j}} = \delta_{i,j}. \quad (40)$$

For a focal length measurement, denoted by $z_l$, the error vector and Jacobian matrix elements are expressed as:

$$e_l = z_l - x_l \quad (41)$$

$$\frac{\partial h_l}{\partial x_l} = 1 \quad (42)$$

According to an embodiment of the present invention, each frame-to-frame correspondence measurement may be in the form (p, q), where "p" is a point in the current frame and "q" is its corresponding position in the previous frame. These measurements are introduced into the correction step 207 by treating "p" as a constant and "q" as a measured value, i.e., one that the state predicts through the homography H. Each frame-to-frame correspondence 207 thus contributes a measurement "q."

The vectors "p" and "q" are non-homogeneous image coordinates. The corresponding homogenous coordinates are denoted as "$\tilde{p}$" and "$\tilde{q}$." Using our previous notation, the predicted point in the previous frame corresponding to "p" is $h_q(x)$ in inhomogeneous coordinates. We will call the corresponding homogeneous point $\tilde{h}_q(x)$. The homography then maps $\tilde{p}$ in the current frame into $\tilde{h}_q(x)$:

$$\tilde{h}_q = H \tilde{p}. \quad (43)$$

wherein the elements of the error vector are $$e_q = q - h_q = q - \frac{\tilde{h}_q}{\tilde{h}_{q3}} \quad (44)$$

The elements of the Jacobian matrix for a state vector component $x_j$ are as follows:

$$\frac{\partial h_q}{\partial x_j} = \frac{1}{\tilde{h}_{q3}^2}\left[\tilde{h}_{q3}\frac{\partial \tilde{h}_q}{\partial x_j} - \tilde{h}_q \frac{\partial \tilde{h}_{q3}}{\partial x_j}\right]. \quad (45)$$

Accordingly, the Jacobian of the measurements may be computed using the derivatives of the homogeneous vectors, $\partial \tilde{h}_q/\partial x$, determined as provided below, such that all of the dependence on the state comes through the homography H. In reviewing Equations 31-32, it is seen that the homography depends on the height and velocity of the camera, its orientation and angular velocity, and the log focal length and its rate of change.

Height: Using Equation 33, the derivative with respect to z is:

$$\frac{\partial \tilde{h}_q}{\partial z} = \frac{(0,0,1)R_{AVCS}^{c2}K_2^{-1}\tilde{p}}{(z-h_g)^2}K_1 R_{c1}^{c2}R_{AVCS}^{c2}{}^T v. \quad (46)$$

Velocity: Using Equation 33, the derivative with respect to v is:

$$\frac{\partial \tilde{h}_q}{\partial v} = -\frac{(0,0,1)R_{AVCS}^{c2}K_2^{-1}\tilde{p}}{z-h_g}K_1 R_{c1}^{c2}R_{AVCS}^{c2}{}^T. \quad (47)$$

Orientation: The orientation θ affects the matrix $R^{C2}{}_{AVCS}$. The derivative of this with respect to the k-th component of the orientation may be expressed as $J_k(\theta)$, as described in detail in Appendix A. Similarly the derivative of the transpose of $R^{C2}{}_{AVCS}$ is equivalent to the transpose of $J_k(\theta)$. Using Equation 32, the derivative of $h_q$ with respect to $N_k$ is expressed as:

$$\frac{\partial \tilde{h}_q}{\partial \theta_k} = K_1 R_{c1}^{c2}\left\{J_k(\theta)^T\left[I - \frac{v\otimes(0,0,1)}{z-h_g}\right]R_{AVCS}^{c2} + \right.$$
$$\left.(R_{AVCS}^{c2})^T\left[I - \frac{v\otimes(0,0,1)}{z-h_g}\right]J_k(\theta)\right\}K_2^{-1}\tilde{p}. \quad (48)$$

Angular velocity: The angular velocity (ω) affects the rotation matrix $R^{C1}{}_{C2}$. The derivative of this with respect to the k-th component $\omega_k$ of ω may be expressed as $J_k(\omega)$, as described in detail in Appendix A. The derivative of $\tilde{h}_q$ with respect to the k-th component of the angular velocity may be expressed, using Equation 32, as follows:

$$\frac{\partial h_q}{\partial \omega_k} = K_1 J_k(\omega)(R_{AVCS}^{c2})^T\left[I - \frac{v\otimes(0,0,1)}{z-h_g}\right]R_{AVCS}^{c2}K_2^{-1}\tilde{p}. \quad (49)$$

Log focal length: The log focal length enters through the two camera matrices $K_1$ and $K_2$. Denoting the log focal length at the current state as "l" the rate of change as "b," and the width and height of the image as "w" and h, $K_1$ and $K_2$ are expressed as follows:

$$K_1 = \begin{pmatrix} e^{l-\tau b}/w & 0 & 0 \\ 0 & e^{l-\tau b}/h & 0 \\ 0 & 0 & 1 \end{pmatrix} \text{ and} \quad (50)$$

$$K_2 = \begin{pmatrix} e^l/w & 0 & 0 \\ 0 & e^l/h & 0 \\ 0 & 0 & 1 \end{pmatrix}. \quad (51)$$

The derivative with respect to l of either of $K_1$ and $K_2$ is the same matrix but with a zero inserted for element 3, 3. The derivative of the inverse of either of these is minus the same matrix, with a zero inserted for element 3, 3. These can be represented by multiplying by a diagonal matrix with "ones" for the first two diagonal elements and a "zero" for the third. According to an embodiment of the present invention, $\tilde{q}$ and $\tilde{p}$ may be denoted with their third element set to "zero" as the points at infinity $\tilde{q}_{inf}$ and $\tilde{p}_{inf}$.

Furthermore, the part of H between $K_1$ and $K_2$ may be denoted as "S." The derivative of $\tilde{h}_q$ with respect to l may be expressed as:

$$\frac{\partial \tilde{h}_{qi}}{\partial l} = \left[\frac{\partial H}{\partial l}\tilde{p}\right]_i \quad (52)$$
$$= \left[\frac{\partial K_1}{\partial l}SK_2^{-1} + K_1 S\frac{\partial K_2^{-1}}{\partial l}\right]\tilde{p}$$
$$= \tilde{q}_{inf} - H\tilde{p}_{inf}.$$

Rate of change of log focal length: The rate of change of log focal length affects $K_1$. The derivative of $K_1$ with respect to b is minus $K_1$ with the third diagonal element set to zero. As in the description above related to l, the following expression results:

$$\frac{\partial \tilde{h}_{qi}}{\partial b} = \left[\frac{\partial H}{\partial b}\tilde{p}\right]_i \quad (53)$$
$$= \frac{\partial K_1}{\partial b}SK_2^{-1}\tilde{p}$$
$$= -\tilde{q}_{inf}.$$

The above description, presented in an exemplary form, is based on the Augmented EKF 108 having an update cycle once per frame, using both frame-to-frame correspondences 107 and camera pose measurements 106 received since the previous update cycle. According to another embodiment of the present invention, the update cycle may be performed at any suitable interval, other than once per frame, allowing for the asynchronous arrival of camera pose measurements 106 and/or frame-to-frame correspondences 107. One having ordinary skill in the art will appreciate that each update cycle may incorporate camera pose measurements 106, frame-to-frame correspondences 107, both, or neither (comprising a prediction step 205 only).

According to this embodiment involving asynchronous processing, it is important that the estimate of the previous camera pose, which is needed to compute the homography, corresponds to the correct time. For example, if the Augmented EKF 108 updates at time "$t_2$" using correspondences between frames at times "$t_1$" and "$t_2$," then the estimated camera state 111 is determined at time $t_1$. The estimated camera state 111 at $t_1$ may be obtained using Equations 29 and 30, wherein $\tau=t_2-t_1$. Alternatively, the state estimate at $t_1$ may be stored, and then used later to obtain the desired camera pose measurements 106.

According to an embodiment of the present invention, in determining a refined camera pose estimate 113, the video processing system 100 may incorporate frame-to-ground correspondences, in addition to or instead of the camera pose measurements 106 and/or frame-to-frame correspondences 107. Advantageously, incorporating frame-to-ground correspondences in the analysis further improves the estimate of camera pose. The frame-to-ground correspondences may come from any of several sources, including, but not limited to, a manual designation by a human operator, and/or an automated geo-registration of video frames, as described in U.S. Pat. No. 6,597,818, titled "Method and apparatus for performing geo-spatial registration of imagery" and in the article titled "Adding precision to airborne video with model based registration," published in *Second International Workshop on Digital and Computational Video* (IEEE Computer Society, February 2001), both of which are incorporated by reference herein.

According to this embodiment, the camera projection matrix maps points in the world to the images in the camera 10 (see, e.g., the article titled "Multiple View Geometry in Computer Vision") and is represented by the following equation:

$$P=KR[I-C]; \quad (54)$$

wherein the matrix K is the camera calibration matrix, R rotates world coordinates of points into camera coordinates, and the vector C is the (inhomogeneous) world coordinates of the camera center.

The frame-to-ground point correspondences, are pairs of vectors (Q, q), where Q is a point in inhomogeneous world coordinates, while q is the inhomogeneous coordinates of that point in the video frame, and the corresponding homogeneous vectors are denoted as "$\tilde{Q}$" and "$\tilde{q}$". Accordingly, the predicted homogeneous image coordinates are $\tilde{h}_g(x)=PQ$, which may be expressed as:

$$\tilde{h}_g = KR[I - C]\tilde{Q} \quad (55)$$
$$= KR[Q - C]. \quad (56)$$

The information related to the camera parameters, the Augmented EKF 108 state vector, is denoted as K, R, and C. These may be represented in terms of the state vector's components. A decision is required as to how to represent those components and what world coordinates are to be used in Equation 56. For example, for the calibration matrix, the decision is non-critical; thus for a pinhole camera with principal point at the origin of the image coordinates, the matrix may be expressed as:

$$K = \begin{pmatrix} f & & \\ & f & \\ & & 1 \end{pmatrix}, \quad (57)$$

where f is the camera's focal length (which may be expressed in the same units as the image coordinates) Further, the component of the state vector may be expressed as the logarithm of f, denoted as l, resulting in the following equation:

$$K(l) = \begin{pmatrix} e^l & & \\ & e^l & \\ & & 1 \end{pmatrix}. \quad (58)$$

Longitude, latitude and height above the reference ellipsoid are used for position in the state. For orientation, the rotation of points from AVCS to the camera's coordinate system are used, such that $R=R^c_{AVCS}=R(\theta)$. For world coordinates, AVCS coordinates are used at the predicted position of the camera (i.e., the coordinates predicted by the Augmented EKF 108, prior to the correction step 207). If both Q and C are expressed as longitude, latitude and height, then they are to be converted to meters so these coordinates may be rotated. Local conversion factors are used, denoted as $m_x$ and $m_y$, in terms of meters per degree. Accordingly, Equation 56 may be expressed as:

$$\tilde{h}_g = KR_c^{AVCS}\begin{pmatrix} m_l & & \\ & m_g & \\ & & 1 \end{pmatrix}[Q - C]. \quad (59)$$

For M equal to a diagonal matrix with the m's, C equal to the state vector component u, the following equation results:

$$\tilde{h}_g=K(l)R(\theta)^TM[Q-u]. \quad (60)$$

The following is a description of the correction step 207 according to this embodiment of the present invention. In order to perform the correction step 207, values for the error vector "e," the measurement co-variance matrix "R," and the Jacobian matrix "J" are required. As in the description above related to the frame-to-frame correspondences 107, "Q" is treated as a constant and "q" as a measured value (i.e., one that the state predicts through the camera projection matrix P).

According to this embodiment of the present invention, $h_g$ represents the homogeneous coordinates of the position at which the ground point Q is projected into the video frame by the predicted camera pose "x," wherein this position is computed using Equation 60. Accordingly, the elements of the error vector are expressed as follows:

$$e_g = \tilde{q} - \frac{\tilde{h}_g}{\tilde{h}_g s} \quad (61)$$

The covariance of the error in q, as supplied by the Frame Correspondence Generator 104, is used to determine the measurement covariance matrix. The elements of the Jacobian matrix for a state vector component $x_j$ are:

$$\frac{\partial h_g}{\partial x_j} = \frac{1}{\tilde{h}_{g3}^2}\left[\tilde{h}_{g3}\frac{\partial \tilde{h}_g}{\partial x_j} - \tilde{h}_g\frac{\partial \tilde{h}_{g3}}{\partial x_j}\right]. \quad (62)$$

which may be represented as multiplication of the derivatives of the homogeneous vector by a matrix that depends on the homogeneous vector, such as:

$$\frac{\partial h_g}{\partial x_j} = \begin{pmatrix} 1/\tilde{h}_{g3} & 0 & -\tilde{h}_{g1}/\tilde{h}_{g3}^2 \\ 0 & 1/\tilde{h}_{g3} & -\tilde{h}_{g2}/\tilde{h}_{g3}^2 \end{pmatrix}\frac{\partial \tilde{h}_g}{\partial x_j}. \quad (63)$$

Next, the derivatives of the homogenous vector $h_g$ are computed using Equation 60, as follows:

$$\frac{\partial \tilde{h}_g}{\partial u} = -K(l)R(\theta)^T M, \quad (64)$$

$$\frac{\partial \tilde{h}_g}{\partial \theta_k} = K(l)J_k(\theta)^T M[Q-u], \text{ and} \quad (65)$$

$$\frac{\partial \tilde{h}_g}{\partial l} = \begin{pmatrix} 1 & & \\ & 1 & \\ & & 0 \end{pmatrix}\tilde{h}_g. \quad (66)$$

wherein $J_k(\theta)$ is the partial derivative of $R(\theta)$ with respect to the k-th component of $\theta$, as defined in Appendix A.

Although the present invention has been described in considerable detail with reference to certain preferred embodiments and versions, other versions and embodiments are possible. Therefore, the scope of the present invention is not limited to the description of the versions and embodiments expressly disclosed herein. The references and disclosure cited in the application are not admitted to be prior art with respect to the disclosure provided in the present application.

Appendix A: Rotation Representations and Derivatives

This appendix provides relevant background information concerning representations of rotation or orientation, and their derivatives.

In this Appendix, $\alpha$ denotes an angle-axis vector, $\phi=\|\alpha\|$ is its magnitude, and $\hat{\alpha}=\alpha/\phi$ denotes the normalized axis vector. The Rodriguez' formula for the corresponding rotation matrix is:

$$R(\alpha)=(1-\cos\phi)\hat{\alpha}\hat{\alpha}^T+\cos\phi+\sin\phi[\hat{\alpha}]_x; \quad (67)$$

where $[v]_x$ is the cross-matrix of the vector v. In component form this is $$R(\alpha)_{ij}=(1-\cos\phi)\hat{\alpha}_i\hat{\alpha}_j+\cos\phi\delta_{ij}-\sin\phi\epsilon_{ijk}\hat{\alpha}k \quad (68)$$

Here the i-th component of $\alpha$ is denoted as $\alpha_i$, and the Einstein summation convention is used in the last term. Accordingly, there is an implied sum over k, due to the fact that it is repeated. The quantity $\epsilon_{ijk}$ is defined by its properties, namely that it is completely anti-symmetric under exchange of any two neighboring indices (meaning $\epsilon_{ijk}=-\epsilon_{ijk}=-\epsilon_{ijk}$ for any i, j, k in $\{1, 2, 3\}$), and $\epsilon_{123}=1$.

A.1 Angle-axis Derivative

In the prediction step 205, the update equation:

$$R(\theta_{t+1})=R(\theta_t)R(\omega) \quad (69)$$

is approximated with a first-order Taylor series expansion of the form $$\theta_{t+1}=\theta_t+J(\theta_t)\omega_t; \quad (70)$$

wherein $J(\theta)$ is the partial derivative of $\theta$ with respect to $\omega$, taken at $\theta$. In this case, $\theta$ represents a rotation from camera to AVCS coordinates, and $\omega$ is a rate of rotation in AVCS coordinates. The formula for $J(\theta)$ is provided as equation C.151 in "Global Positioning Systems, Inertial Navigation, and Integration," by M. Grewal, L. Weill, and A. Andrews (John Wiley & Sons, Inc., 2001). In terms of the angle-axis notation defined above, it is $$J(\alpha) = \hat{\alpha}\hat{\alpha}^T + \frac{\theta\sin\theta}{2(1-\cos\theta)}(I - \hat{\alpha}\hat{\alpha}^T) + \frac{\theta}{2}[\hat{\alpha}]_x. \quad (71)$$

A.2 Rotation Matrix Derivative

In the correction step 207, when correcting orientation using frame-to-frame correspondences 107, the derivative of a rotation matrix $R(\alpha)$ with respect to the k-th component of $\alpha$ is used, and denoted as $J_k(\alpha)$.

Note first that $$\frac{\partial \hat{\alpha}_i}{\partial \alpha_j} = \frac{1}{\phi}[\delta_{ij} - \hat{\alpha}_i\hat{\alpha}_j] \text{ and} \quad (72)$$

$$\frac{\partial \phi}{\partial \alpha_i} = \hat{\alpha}_i. \quad (73)$$

The partial derivative of $R(\alpha)_{ij}$ with respect to $\alpha_k$ is then $$\frac{\partial R(\alpha)_{ij}}{\partial \alpha_k} = (\hat{\alpha}_i\delta_{jk} + \hat{\alpha}_j\hat{\alpha}_{ik})\frac{1-\cos\phi}{\phi} - \hat{\alpha}_k\hat{\alpha}_{ij}\sin\phi - \quad (74)$$

$$\hat{\alpha}_i\hat{\alpha}_j\hat{\alpha}_k\left[\frac{2(1-\cos\phi)}{\phi} - \sin\phi\right] - \frac{\sin\phi}{\phi}\epsilon_{ijk} + \left(\frac{\sin\phi}{\phi} - \cos\phi\right)\epsilon_{ijk}\hat{\alpha}_j\hat{\alpha}_k.$$

This may be expressed in matrix form as follows:

$$\frac{\partial R(\alpha)}{\partial \alpha_k} = \frac{1-\cos\phi}{\phi}(\hat{\alpha}e_k^T + e_k\hat{\alpha}^T) - \hat{\alpha}_k\sin\phi I - \quad (75)$$

$$\hat{\alpha}_k\left[\frac{2(1-\cos\phi)}{\phi} - \sin\phi\right]\hat{\alpha}\hat{\alpha}^T + \frac{\sin\phi}{\phi}\sigma_k - \hat{\alpha}_k\left(\frac{\sin\phi}{\phi} - \cos\phi\right)[\hat{\alpha}]_x.$$

wherein $\sigma_k$ is the matrix with elements $[\sigma_k]_{ij}=-\epsilon_{ijk}=[e_k]_x$. (These are generators of rotations of three-vectors. In terms of these the cross matrix $[v]_x$ is $\upsilon N_k\sigma_k$, with the implied sum over k.) The expression in Equation 75 is abbreviated as:

$$J_k(\alpha) = \frac{\partial R(\alpha)}{\partial \alpha_k} \quad (76)$$

If φ is small, $J_k$ may be approximated to first order as $$J_k(\alpha) = \frac{\phi}{2}(\hat{a}e_k^T + e_k\hat{a}^T) - \phi\hat{a}_k I + \sigma_k \qquad (77)$$

which is equivalent to $\sigma_k$ to the zeroth order.

If the k index is contracted with a vector $\omega_k$, the following expression results:

$$\frac{\partial R(\alpha)}{\partial \alpha_k}\omega_k = \frac{1-\cos\phi}{\phi}(\hat{a}\omega^T + \omega\hat{a}^T) - \qquad (78)$$

$$(\hat{a}^T\omega)\sin\phi I - (\hat{a}^T\omega)\left[\frac{2(1-\cos\phi)}{\phi} - \sin\phi\right]\hat{a}\hat{a}^T +$$

$$\frac{\sin\phi}{\phi}[\omega]_x - \left(\frac{\sin\phi}{\phi} - \cos\phi\right)(\hat{a}^T\omega)[\hat{a}]_x.$$

What is claimed is:

1. A video processing system comprising:
   a camera pose measurement extractor configured to extract at least one camera pose measurement from video metadata associated with a video input provided by at least one communicatively connected camera;
   a frame correspondence generator configured to generate at least one frame-to-frame correspondence based at least in part on video frames associated with the video input provided by the at least one communicatively connected camera;
   an augmented Extended Kalman Filter (EKF) configured to generate an estimated camera state based at least in part on the camera pose measurements received from the communicatively connected camera pose measurement extractor, the frame-to-frame correspondences received from the frame correspondence generator, and a range estimation received from a communicatively connected range estimator; and
   a camera pose estimator configured to generate a refined camera pose estimate based at least in part on the estimated camera state received from the communicatively connected augmented EKF.

2. The video processing system according to claim 1, wherein the frame correspondence generator generates the at least one frame-to-frame correspondence based at least in part on a comparison of a first video frame and a subsequent video frame received from a communicatively connected frame storage database configured to store the video frames associated with the video input received from the at least one camera.

3. The system of claim 1, wherein the augmented EKF is configured to:
   predict an estimated camera state based on the at least one camera pose measurement and the at least one frame-to-frame correspondence;
   compute a frame-to-frame homography based on the range estimation and estimated camera state;
   correct the predicted estimated camera state based on the at least one camera pose measurement, the at least one frame-to-frame correspondence, and the frame-to-frame homography.

4. The system of claim 1, wherein the augmented EKF is configured to update the estimated camera state according to an update cycle.

5. The system of claim 4, wherein the update cycle is once per video frame.

6. The system of claim 4, wherein the update cycle is an interval such that the at least one camera pose measurement and the at least one frame-to-frame correspondence are received asynchronously by the augmented EKF.

7. The system of claim 1, wherein the estimated camera state comprises an instant pose of the camera, a rate of change of the pose of the camera, and uncertainty in the instant pose of the camera and the rate of change of the pose of the camera.

8. The system of claim 1, wherein the estimated camera state is further based on at least one frame-to-ground correspondence.

9. The system of claim 1, wherein the at least one camera pose measurement comprises at least one of a location of the camera, a velocity of the camera, an acceleration of the camera, an orientation of the camera, a rate of rotation of the camera, a focal length of the camera, and a rate of change of the focal length of the camera.

10. A method of processing a video input, comprising the steps of:
    receiving the video input comprising video metadata and video frames from at least one camera;
    extracting at least one camera pose measurement from the video metadata;
    generating a frame-to-frame correspondence based on a comparison of at least two of the video frames;
    estimating a camera state based on the at least one camera pose measurement, frame-to-frame correspondence, and a range estimation; and
    estimating a refined camera pose estimate based on the estimated camera state.

11. The method of claim 10, wherein the step of estimating the camera state further comprises:
    predicting a predicted estimated camera state,
    computing a homography based at least in part on the predicted estimated camera state and a range estimation; and
    correcting the predicted estimated camera state based at least on the frame-to-frame correspondence, the at least one camera pose measurement, and the homography.

12. The method of claim 11, wherein the homography is a frame-to-frame homography.

13. The method of claim 11, wherein the step of correcting includes consideration of a frame-to-ground correspondence.

14. The method of claim 10, wherein the range estimation is generated by a digital terrain elevation model.

15. The method of claim 10, wherein the at least one camera pose measurement includes at least one of a location of the camera, a velocity of the camera, an acceleration of the camera, an orientation of the camera, a rate of rotation of the camera, a focal length of the camera, and a rate of change of the focal length of the camera.

16. The method of claim 10, wherein the step of estimating the camera state is performed by an augmented Extended Kalman Filter.

17. The method of claim 10, wherein the step of estimating the camera state is performed by a discrete sequential estimation filter.

18. The method of claim 10, wherein the estimated camera state comprises an instant pose of the at least one camera, a rate of change of the pose of the at least one camera, and an uncertainty in the instant pose and the rate of change of the pose of the at least one camera.

19. The method of claim 10, wherein the step of estimating the camera state is repeated at a set interval.

20. The method of claim 19, wherein the set interval is once per video frame.

21. A computer-readable storage medium storing computer code for monitoring a target scene, wherein the computer code comprises:
- code for receiving a video input comprising video metadata and video frames;
- code for extracting at least one camera pose measurement from the video metadata;
- code for generating a frame-to-frame correspondence based on a comparison of at least two of the video frames;
- code for estimating a camera state based on the at least one camera pose measurement, frame-to-frame correspondence, and a range estimation; and
- code for estimating a refined camera pose estimate based on the estimated camera state.

22. The computer-readable storage medium of claim 21 further comprising:
- code for predicting a predicted estimated camera state,
- code for computing a homography based at least in part on the predicted estimated camera state and a range estimation; and
- code for correcting the predicted estimated camera state based at least on the frame-to-frame correspondence, the at least one camera pose measurement, and the homography.

* * * * *